United States Patent
Jones et al.

(10) Patent No.: US 10,331,918 B2
(45) Date of Patent: Jun. 25, 2019

(54) LINE DETERMINATION BASED ON RFID

(71) Applicant: Walmart Apollo, LLC, Bentonville, AR (US)

(72) Inventors: Nicholaus A. Jones, Fayetteville, AR (US); Alvin S. Taulbee, Springdale, AR (US); Jeremy R. Tingler, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/021,325

(22) Filed: Jun. 28, 2018

(65) Prior Publication Data

US 2019/0005280 A1    Jan. 3, 2019

Related U.S. Application Data

(60) Provisional application No. 62/526,832, filed on Jun. 29, 2017.

(51) Int. Cl.

| G06K 7/10 | (2006.01) |
|---|---|
| G07F 7/08 | (2006.01) |
| G07G 1/00 | (2006.01) |
| G06Q 20/20 | (2012.01) |
| G08C 17/02 | (2006.01) |

(52) U.S. Cl.
CPC ............. *G06K 7/10* (2013.01); *G06Q 20/204* (2013.01); *G07F 7/08* (2013.01); *G07G 1/009* (2013.01); *G08C 17/02* (2013.01)

(58) Field of Classification Search
USPC ....................................................... 235/492
See application file for complete search history.

(56) References Cited

U.S. PATENT DOCUMENTS

| 8,510,163 B2 | 8/2013 | Hess |
|---|---|---|
| 8,639,543 B2 | 1/2014 | Boss |
| 2005/0259653 A1 | 11/2005 | Reuveni |

(Continued)

FOREIGN PATENT DOCUMENTS

GB    2445766    7/2008

OTHER PUBLICATIONS

PCT; App. No. PCT/US2018/039399; International Search Report and Written Opinion dated Sep. 7, 2018.

*Primary Examiner* — Rafferty D Kelly
(74) *Attorney, Agent, or Firm* — Fitch, Even, Tabin & Flannery LLP

(57) ABSTRACT

In some embodiments, apparatuses, systems, and methods are provided herein useful to determining qualities of a line at a POS terminal in a retail establishment. In some embodiments, a systems comprises one or more RFID tags, wherein the one or more RFID tags are located near the POS terminal, an RFID reader configured to read signals transmitted from the one or more RFID tags, and a control circuit communicatively coupled to the RFID reader, the control circuit configured to receive, from the RFID reader, an indication of the signals transmitted from the one or more RFID tags, determine, based on the indication of the signals from the one or more RFID tags, properties of the signals transmitted by the one or more RFID tags, and estimate, based on the properties of the signals transmitted from the one or more RFID tags, a number of people in line at the POS terminal.

20 Claims, 3 Drawing Sheets

(56) References Cited

U.S. PATENT DOCUMENTS

| | | | |
|---|---|---|---|
| 2008/0290182 A1* | 11/2008 | Bell | G06Q 10/04 |
| | | | 235/61 V |
| 2009/0033491 A1 | 2/2009 | Saunders | |
| 2010/0036706 A1 | 2/2010 | Cohen | |
| 2014/0236653 A1* | 8/2014 | Farrell | G07G 1/0036 |
| | | | 705/7.15 |
| 2015/0286964 A1 | 10/2015 | Monk | |
| 2016/0110569 A1* | 4/2016 | Konishi | G06K 7/0008 |
| | | | 340/10.2 |

* cited by examiner

LINE DETERMINATION BASED ON RFID

CROSS-REFERENCE TO RELATED APPLICATION

This application claims the benefit of U.S. Provisional Application No. 62/526,832, filed Jun. 29, 2017, which is incorporated by reference in its entirety herein.

TECHNICAL FIELD

This invention relates generally to radio frequency identification (RFID) technology and, more specifically, uses of RFID technology in a retail facility.

BACKGROUND

In addition to causing frustration for shoppers, long lines at point-of-sale (POS) terminals can negatively impact a retailer's sales and revenue. For example, shoppers may defer a purchase, or may be unlikely to return to the shopping area after getting in line to retrieve additional products if lines are long. While an employee can be tasked with monitoring line length, this solution is not optimal. For example, when an employee is utilized to monitor line length, the employee may not be able to quickly and accurately determine the types and quantities of products customers are buying, how long it will take to complete each customer's transaction, etc. Additionally, assigning an employee to such a task requires the retailer to either reassign an employee, potentially leaving the retailer short-handed elsewhere, or pay to add an additional employee. Consequently, a need exists for accurate and cost-effective systems and methods for monitoring qualities of a line, such as the length, at POS terminals.

BRIEF DESCRIPTION OF THE DRAWINGS

Disclosed herein are embodiments of systems, apparatuses, and methods pertaining to determining qualities of a line at a POS terminal in a retail establishment. This description includes drawings, wherein.

Figure 1:
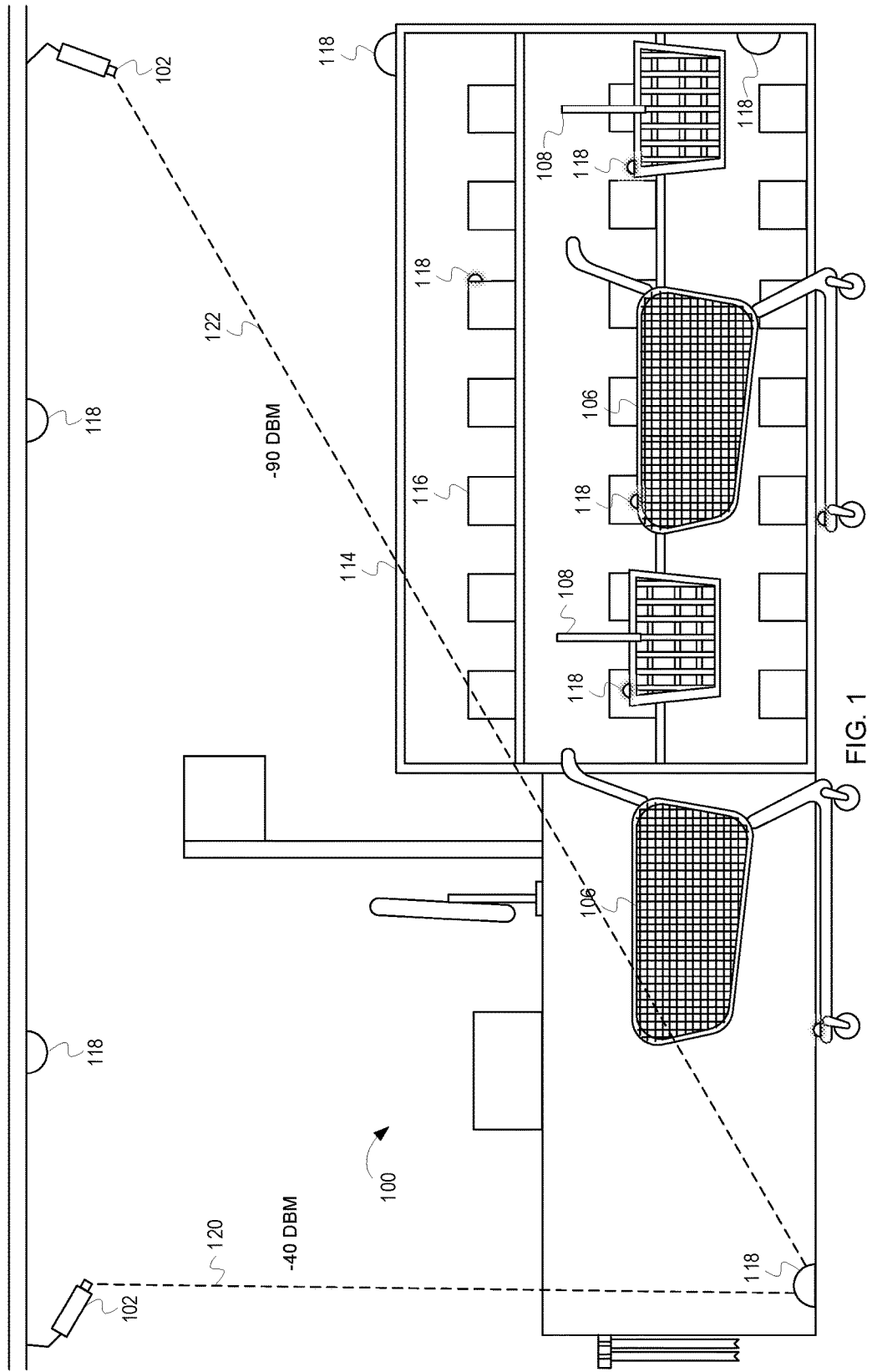
FIG. 1 depicts a checkout area including a POS terminal 100 and a plurality of radio frequency identification (RFID) tags 118 located near the POS terminal 100, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to determining qualities of a line at a POS terminal in a retail establishment. In some embodiments, a systems comprises one or more RFID tags, wherein the one or more RFID tags are located near the POS terminal, an RFID reader configured to read signals transmitted from the one or more RFID tags, and a control circuit communicatively coupled to the RFID reader, the control circuit configured to receive, from the RFID reader, an indication of the signals transmitted from the one or more RFID tags, determine, based on the indication of the signals from the one or more RFID tags, properties of the signals transmitted by the one or more RFID tags, and estimate, based on the properties of the signals transmitted from the one or more RFID tags, a number of customers in line at the POS terminal.

As previously discussed, long wait times at POS terminals can negatively impact customers' perceptions of a retail facility, as well as the retail facility's sales and revenue. While intuitively it may seem like assigning an employee to monitor line lengths would be a suitable solution, this approach has many drawbacks. First, assigning an employee to monitor line length requires an employee to be moved from a different task or an additional employee to be added. If an employee is a reassigned, it may leave another portion of the retail facility understaffed. If an additional employee is utilized, it raises staffing costs for the retail facility. Second, an employee is likely limited in the amount of information he or she can perceive. For example, while an employee may be able to quickly discern that one line has three shopping carts and another four, it is unlikely that the employee is able to quickly determine how many items, and what kinds of items, are in each cart. Further, without this information, the employee may not be very good at predicting an action to take, such as opening another register, based on the line length. Consequently, a need exists for a system that can quickly determine qualities about a line at a POS terminal, such as the line length, the types and number of items in shopping carts and baskets, the number of customers in line, etc.

Described herein are systems, methods, and apparatuses capable of determining such qualities of a line. In some embodiments, the systems, methods, and apparatuses utilize radio-frequency identification (RFID) tags positioned near the POS terminal. An RFID reader reads signals transmitted from the RFID tags and a control circuit determines qualities of the line based on properties of the transmitted signals. For example, the control circuit can determine a number of shopping carts and shopping baskets in the line, as well as the number and types of items in each shopping cart and shopping basket based on properties of the signals transmitted by the RFID tags, such as signal strength, location from which the signal is transmitted, a direction in which the signal is traveling, and interference with the signal. The discussion of FIG. 1 provides an overview of such a system.

FIG. 1 depicts a checkout area including a POS terminal 100 and a plurality of RFID tags 118 located near the POS terminal 100, according to some embodiments. The checkout area can also include a product display unit, such as a shelving unit 114. The RFID tags 118 are located in various locations near the POS terminal 100. For example, the RFID tags 118 can be located on the POS terminal 100, above the POS terminal 100, on the shelving unit 114, on shopping baskets 108, on carts 106, on products 116 on the shelving unit 114, on the floor, etc. It should be noted that these are just example locations (i.e., the RFID tags 118 can be located in any suitable location) and that the RFID tags 118 depicted in FIG. 1 are enlarged relative to most embodiments for clarity.

RFID readers 102 interact with the RFID tags 118. In embodiments in which the RFID tags 118 are passive, the RFID readers 102 interact with the RFID tags 118 by emanating energy toward the RFID tags 118. The energy energizes the RFID tags 118 and the RFID tags 118 respond to the RFID readers 102 by transmitting a signal from the RFID tags 118 to the RFID readers 102. In embodiments in which the RFID tags 118 are active, the RFID tags 118 can actively transmit the signals to the RFID readers 102 (i.e., without first being energized by a transmission from the RFID readers 102). In either embodiment, the signal can include identification information (e.g., identifying the RFID tag 118 or a surface (e.g., such as a product display unit or product 116) with which the RFID tag 118 is associated). In some embodiments, qualities of the signal can be determined directly from this identification information. For example, if each of the shopping carts 106 and baskets 108 includes an RFID tag 118 and the signals transmitted from the RFID tags 118 identifies the shopping carts 106 and baskets 108, the number of shopping carts 106 and baskets 108 can be calculated. Similarly, if the products 116 in the shopping carts 106 and baskets 108 include RFID tags 118, the number, and in some embodiments the type, of the products 116 in line, and in some embodiments in each shopping cart 106 or basket 108, can be determined.

In addition to determining qualities of the line directly, in some embodiments, qualities of the line can be determined indirectly. For example, the location of RFID tags 118 (whether on carts 106, baskets 108, product display units 114, etc.) can be determined based on the RFID signals. Systems, methods, and apparatuses for determining locations of RFID tags are discussed in U.S. Pat. No. 9,310,466 to Wal Mart Stores, Inc., which is hereby incorporated by reference in its entirety. The location of the RFID tags 118 can be useful in determining which line (i.e., at which POS terminal 100) the RFID tags 118 are located.

Additionally, in some embodiments, the number of people in line can be estimated indirectly. For example, if the properties of the signals transmitted from the RFID tags 118 are the strength of the signal received by the RFID readers 102 (i.e., signal strength) and the direction from which the signal emanated, the number of shopping carts 106 and/or shopping baskets 108 can be estimated inferentially. That is, if the strength of the signal received is half of what it would be in the absence of shopping carts 106 and baskets 108, the number of shopping carts 106 and/or baskets 108 in line can be estimated. As one example, if the carts 106 include a metal cage, the signals will be blocked if the distance between bars of the metal cage is less than one quarter of the wavelength of the signal. In some embodiments, current RFID signals can be compared to baseline RFID signals. If the RFID readers 102 and the RFID tags 118 are stationary (e.g., located on the ceiling an around the POS terminal, respectively), received signal strength indicator (RSSI) values can be used to detect the presence of carts 106, baskets 108, and people. For example, RFID tags 118 near an RFID reader 102 may have an RSSI value of approximately −40 dBm (e.g., as depicted by the line 120). RFID tags 118 located between RFID readers 102 may have an RSSI value of approximately −60 dBm. When an object, such as a cart 106 or basket 108, is interfering with, or enhancing, the RFID signal, the RSSI value will change. For example, the RSSI value may decrease when objects are between the RFID tag 118 and the RFID reader 102 (e.g., as depicted by the line 122). Additionally, dependent upon the object, the RSSI value may increase when the object is positioned between an RFID tag 118 and an RFID reader 102. The presence of an object can be determined based on these fluctuations from the baseline value. That is, when the RFID signal is different than the baseline value, it can be assumed that an object is positioned between the RFID tag 118 and the RFID reader 102.

Additionally, in some embodiments, the system can estimate a number of people (e.g., carts 106, baskets 108, people, etc.) in the line. For example, if two people are in line, the RSSI value for the RFID signal will fluctuate twice: once when each person passes between the RFID tag 118 and the RFID reader 102. Additionally, because the carts 106 are a relatively uniform length, the amount of time that a signal is blocked (i.e., a "non-read" period) is indicative of the number of carts 106 in the line. In addition to the amount of time that the RFID readers 102 stop reading the signal (i.e., the amount of time that the signal is blocked), patterns in the loss of signal can be used to determine the qualities of the line. Additionally, the direction from which the signal emanated can be used to determine or estimate the location of the RFID tag 118 from which the signal emanated. For example, an object in a cart 106 or basket 108 may reflect the signal, causing the signal to be read by an RFID reader 102 that would not typically read the signal. Further, other objects, such as the customers themselves, may reflect and absorb some of the signals. This absorption can affect signal strength and the reflection can alter which RFID readers 102 read the signals.

Further, in some embodiments, the qualities of the line can be determined based on both direct and indirect information. For example, the amount of interference detected in the signals may allow an inference that a customer is standing in line without a shopping cart 106, and the types and number of products 116 that the customer is holding may be determined directly from RFID tags 118 associated with the items. As another example, if the signal identifies the RFID tag 118 from which it emanates, and is read by an RFID reader 102 which would not typically read the RFID tag, it can be determined that a reflective object, such as a shopping cart 106, is located between the RFID tag 118 and the RFID reader 102.

In addition to determining the qualities of the line at the POS terminal 100, in some embodiments, it can be determined that actions should be performed based on the qualities of the line. For example, if the qualities of the line indicate that the number of people in line, the number of items in the line, the average number of items per cart 106, etc. exceed a threshold, it can be determined that another POS terminal 100 should be opened. Further, in some embodiments, information in addition to the qualities of the line can be used to determine an action to perform (e.g., external information, such as the type of POS terminals 100 open). As one example, if the qualities of the line indicate that the line includes three shopping carts 106, each having a large number of products 116, two shopping baskets 108, each have a relatively small number of products 116, and the external information indicates that there are no "express lanes" open, the action can be to open an "express lane." Further, in some embodiments, notifications can be generated and transmitted which indicate the determined action.

In such embodiment, the notification can be transmitted. For example, a notification can be transmitted indicating that additional POS terminal 100 should be opened.

To better improve inferences and action determinations, in some embodiments, the inferences can be compared with sales data generated by the POS terminal 100. For example, if it is determined or estimated that a shopping cart 106 contained seventeen items, the determination or estimation can be checked against the sales data for that transaction. As another example, if it is determined or estimated that opening an "express lane" will cause two customers with shopping baskets 108 to move to the "express lane," this determination or estimation can be checked based on the sales data.

Figure 2:
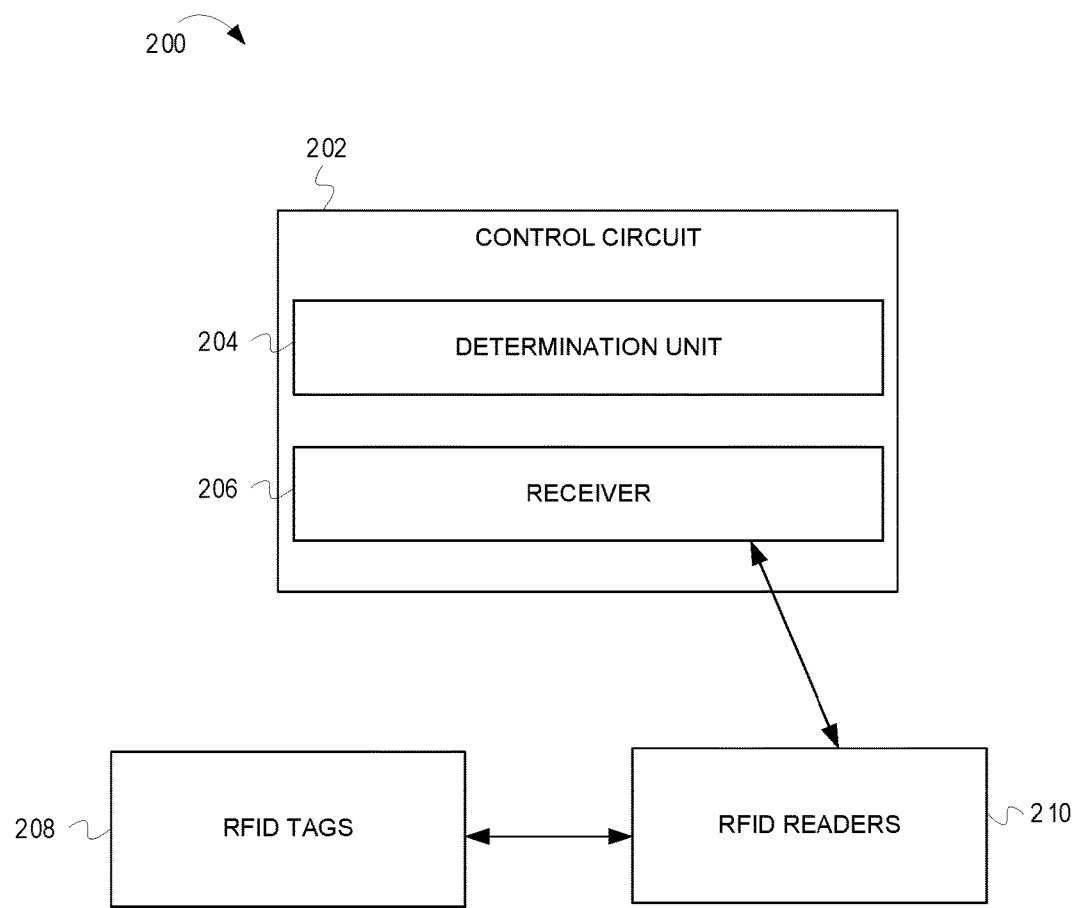
FIG. 2 is a block diagram of a system 200 for determining qualities of a line at a POS terminal in a retail establishment, according to some embodiments.

While the discussion of FIG. 1 provides an overview of using RFID technology to determine qualities of a line at a POS terminal, the discussion of FIG. 2 provides additional details of a system which can be used to determine the qualities of a line at a POS terminal.

FIG. 2 is a block diagram of a system 200 for determining qualities of a line at a POS terminal in a retail establishment, according to some embodiments. The system 200 includes a control circuit 202, RFID tags 208, and RFID readers 210. The RFID tags 208 can be located in any suitable area about a POS terminal and can be passive and/or active RFID tags 208. The RFID readers 210 can likewise be positioned in any suitable area about the POS terminal. The RFID readers 210 are configured to read signals transmitted from the RFID tags 208. The RFID readers 210 are communicatively coupled to the control circuit 202. The RFID readers 210 transmit indications of the signals transmitted from the RFID tags 208 to the control circuit 202.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

In some embodiments, the control circuit 202 includes a determination unit 204 and a receiver 206. The receiver 206 receives indications of the signals transmitted by the RFID tags 208 from the RFID readers 210. In some embodiments, the receiver 206 can also transmit data to other components, such as the RFID readers 210 and or other control circuits 202 (i.e., the receiver 206 can be a transceiver). The determination unit 204 determines properties of the signals transmitted from the RFID tags 208. The properties, for example, can be the strength of the signals, the direction of the signals (i.e., the direction from which the signal emanates), the location of the signal (e.g., the location at which the signal was read), time (e.g., the amount of time between transmitting energy from the RFID readers 210 and reading the RFID tags 208), interference (i.e., interference with the signals), etc. The determination unit 204 determines the qualities of the line based on the properties of the signals transmitted from the RFID tags 208. The qualities of the line, for example, can be a number of customers in the line, a number of carts in the line, a number of baskets in the line, a number of products in the line, a number of customers with neither carts nor baskets in the line, etc. In some embodiments, the determination unit 204 determines the qualities of the line based on a comparison with a baseline value. That is, the determination unit 204 can compare the current properties of the signals transmitted from the RFID tags 208 with a known value, such as the properties of the signals transmitted from the RFID tags 208 when there isn't a line or aren't any products, or when the composition of the line and/or products is known. Further, in some embodiments, the control circuit 202 can constantly or periodically determine the properties of the signals transmitted by the RFID tags 208. Changes in the properties of the signals transmitted by the RFID tags 208 may be indicative of a change in the qualities of the line. In such embodiments, detection of a change in the properties of the signal can trigger a determination of an action by the determination unit 204.

Figure 3:
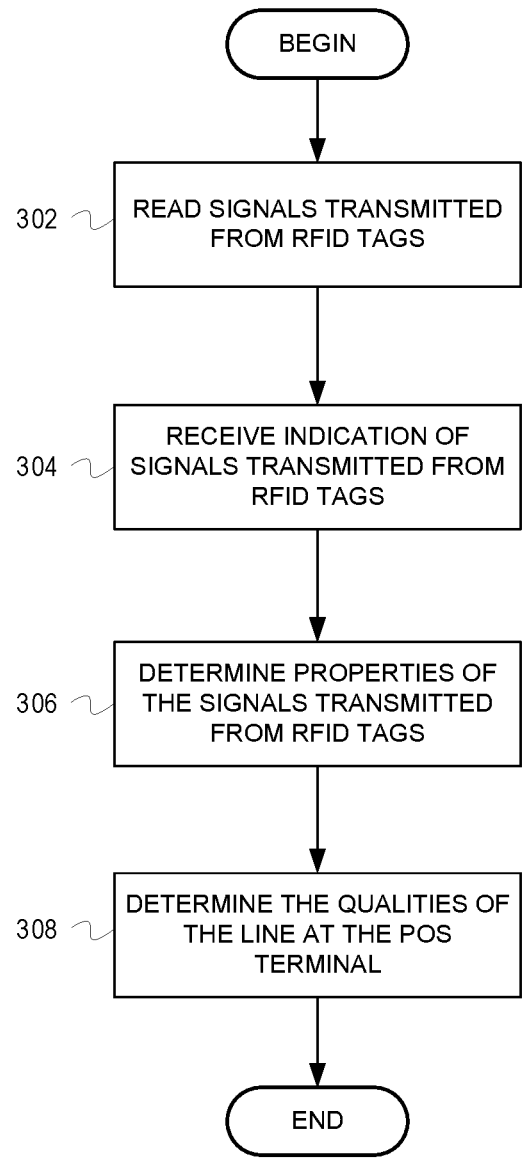
FIG. 3 is a flow diagram including example operations for determining qualities of a line at a POS terminal in a retail establishment, according to some embodiments.

While the discussion of FIG. 2 provides additional information regarding a system which can be used to determine the qualities of a line at a POS terminal, the discussion of FIG. 3 describes example operations for determining the qualities of a line at a POS terminal.

FIG. 3 is a flow diagram including example operations for determining qualities of a line at a POS terminal in a retail establishment, according to some embodiments. The flow begins at block 302.

At block 302, signals transmitted from RFID tags are read. For example, one or more RFID readers can read the signals transmitted from the RFID tags. The RFID tags can be of any suitable type and are located near a POS terminal. The RFID readers are likewise located near the POS terminal. In some embodiments, the signals include identifying information which identifies the RFID tag and/or a product with which the RFID tag is associated. The flow continues at block 304.

At block 304, indications of the signals transmitted from the RFID tags are received. For example, a control circuit can receive the indications of the signals transmitted from the RFID tags to the RFID tag readers. The indications of the signals transmitted from the RFID tags can include the identification information. The flow continues at block 306.

At block 306, properties of the signals transmitted from the RFID tags are determined. For example, the control circuit can determine the properties of the signals transmitted from the RFID tags. The properties, for example, can be the strength of the signals, the direction of the signals (i.e., the direction from which the signal emanates), the location of the signal (e.g., the location at which the signal was read), time (e.g., the amount of time between transmitting energy from the RFID readers and reading the RFID tags), interference (i.e., interference with the signals), or any other suitable property. The control circuit determines the properties of the signals transmitted from the RFID tags based on the indications of the signals transmitted from the RFID tags. The flow continues at block 308.

At block 308, qualities of the line at the POS terminal are determined. For example, the control circuit can determine the qualities of the line at the POS terminal. The qualities of the line, for example, can be a number of customers in the line, a number of carts in the line, a numbers of baskets in the line, a number of products in the line, a number of customers with neither carts nor baskets in the line, or any other suitable quality. In some embodiments, the control circuit can check or verify these determinations based on sales data generated by the POS terminal. Additionally, in some embodiments, the control circuit can determine actions to be taken based on the qualities of the line at the POS terminal and check or verify these determinations based on the sales data.

In some embodiments, a systems comprises one or more RFID tags, wherein the one or more RFID tags are located near the POS terminal, an RFID reader configured to read signals transmitted from the one or more RFID tags, and a control circuit communicatively coupled to the RFID reader, the control circuit configured to receive, from the RFID reader, and indication of the signals transmitted from the one or more RFID tags, determine, based on the indication of the signals from the one or more RFID tags, properties of the signals transmitted by the one or more RFID tags, and determine, based on the properties of the signals transmitted from the one or more RFID tags, the qualities of the line at the POS terminal.

In some embodiments, an apparatus and a corresponding method performed by the apparatus, comprises reading, via an RFID reader, signals transmitted from one or more RFID tags located near the POS terminal, receiving, at a control circuit from the RFID reader, an indication of the signals transmitted from the one or more RFID tags, determining, by the control circuit based on the indication of the signals transmitted from the one or more RFID tags, properties of the signals transmitted from the one or more RFID tags, and determining, based on the properties of the signals transmitted from the one or more RFID tags, the qualities of the line at the POS terminal.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for estimating a number of customers in line at a point-of-sale (POS) terminal in a retail establishment, the system comprising:
   one or more radio frequency identification (RFID) tags, wherein the one or more RFID tags are located near the POS terminal;
   an RFID reader configured to read signals transmitted from the one or more RFID tags; and
   a control circuit communicatively coupled to the RFID reader, the control circuit configured to:
      receive, from the RFID reader, an indication of the signals transmitted from the one or more RFID tags;
      determine, based on the indication of the signals transmitted from the one or more RFID tags, a pattern of read periods and non-read periods, wherein an RSSI value of at least one signal transmitted from the one or more RFID tags is higher during a read period than the RSSI value of the at least one signal transmitted from the one or more RFID tags during a non-read period; and
      estimate, based on the pattern of read periods and non-read periods, the number of customers in line at the POS terminal.

2. The system of claim 1, wherein during the read periods the RFID reader detects signals transmitted from the one or more RFID tag and during the non-read periods the RFID reader does not detect signals transmitted from the one or more RFID tags.

3. The system of claim 1, wherein the control circuit is further configured to:
   determine a number of other POS terminals available;
   determine, based on the number of customers in line at the POS terminal and the number of other POS terminals available, that an additional POS terminal should be opened; and
   cause a notification indicating that the additional POS terminal should be opened to be transmitted.

4. The system of claim 3, wherein the control circuit is further configured to:
   determine a type of each of the other POS terminals available, wherein the additional POS terminal is of a specific type.

5. The system of claim 4, wherein the specific type is one or more of a standard POS terminal, an express POS terminal, a location of a POS terminal, and an employee assigned to the additional POS terminal.

6. The system of claim 1, wherein the number of customers in the line at the POS terminal includes one or more of a number of customers in line, a number of carts in line, a number of baskets in line, and a number of customers with neither carts nor baskets in line.

7. The system of claim 1, wherein the one or more RFID tags are mounted on one or more of a floor, a product display unit, a cart, a basket, a product, and a ceiling.

8. The system of claim 1, wherein the determination of the pattern of read periods and non-read periods is based, at least in part, on a comparison with a baseline value.

9. The system of claim 1, wherein the control circuit is further configured to:
   review POS data; and
   based on the POS data, determine if the estimation of the number of customer in line at the POS terminal was accurate.

10. The system of claim 1, wherein the non-read period occurs when an object is blocking at least one signal transmitted from the one or more RFID tags.

11. A method for estimating a number of customers in line at a point-of-sale (POS) terminal in a retail establishment, the method comprising:
   reading, via a radio frequency identification (RFID) reader, signals transmitted from one or more RFID tags located near the point-of-sale (POS) terminal;
   receiving, at a control circuit from the RFID reader, an indication of the signals transmitted from the one or more RFID tags;
   determining, by the control circuit based on the indication of the signals transmitted from the one or more RFID tags, a pattern or read periods and non-read periods, wherein an RSSI value of at least one signal transmitted from the one or more RFID tags is heigher during a read period than the RSSI value of the at least one signal transmitted from the one or more RFID tags during a non-read period; and estimating, based on the pattern of read periods and non-read periods, the number of customers in line at the POS terminal.

12. The method of claim 11, wherein during the read periods the RFID reader detects signals transmitted from the one or more RFID tags and during the non-read periods the RFID reader does not detect signals transmitted from the one or more RFID tags.

13. The method of claim 11, further comprising:
determining a number of other POS terminals available;
determining, based on the number of customers in line at the POS terminal and the number of other POS terminals available, that an additional POS terminal should be opened; and
causing a notification indicating that the additional POS terminal should be open to be transmitted.

14. The method of claim 13, further comprising:
determining a type of each of the other POS terminals available, wherein the additional POS terminal is of a specific type.

15. The method of claim 14, wherein the specific type is one or more of a standard POS terminal, an express POS terminal, a location of a POS terminal, and an employee assigned to the additional POS terminal.

16. The method of claim 11, wherein the number of customers in line at the POS terminal include one or more of a number of customers in line, a number of carts in line, a number of baskets in line, and a number of customers with neither carts nor baskets in line.

17. The method of claim 11, wherein the one or more RFID tags are mounted on one or more of a floor, a product display unit, a cart, a basket, a product, and a ceiling.

18. The method of claim 11, wherein the determining the read periods and non-read periods is based, at least in part, on a comparison with a baseline value.

19. The method of claim 11, further comprising:
reviewing POS data; and
based on the POS data, determining if the estimation of the number of customers in the line at the POS terminal was accurate.

20. The method of claim 11, wherein the non-read period occurs when an object is blocking at least one signal transmitted from the one or more RFID tags.

* * * * *

UNITED STATES PATENT AND TRADEMARK OFFICE
CERTIFICATE OF CORRECTION

PATENT NO. : 10,331,918 B2
APPLICATION NO. : 16/021325
DATED : June 25, 2019
INVENTOR(S) : Nicholaus A. Jones et al.

It is certified that error appears in the above-identified patent and that said Letters Patent is hereby corrected as shown below:

In the Claims

Column 9, Line 3, Claim 11, delete "heigher" and insert --higher--.

Signed and Sealed this
Seventeenth Day of December, 2019

Andrei Iancu
*Director of the United States Patent and Trademark Office*